United States Patent
Cheatham et al.

(10) Patent No.: US 11,168,839 B2
(45) Date of Patent: Nov. 9, 2021

(54) TRANSPORT ELEMENT SUPPORT ASSEMBLY

(71) Applicant: The Boeing Company, Chicago, IL (US)

(72) Inventors: Benjamin Curtis Cheatham, Kirkland, WA (US); Michael Leslie Gilbertson, Arlington, WA (US)

(73) Assignee: The Boeing Company, Chicago, IL (US)

( * ) Notice: Subject to any disclaimer, the term of this patent is extended or adjusted under 35 U.S.C. 154(b) by 425 days.

(21) Appl. No.: 15/628,018

(22) Filed: Jun. 20, 2017

(65) Prior Publication Data
US 2018/0363850 A1    Dec. 20, 2018

(51) Int. Cl.
| | |
|---|---|
| F16L 5/06 | (2006.01) |
| F16L 27/02 | (2006.01) |
| F17C 5/06 | (2006.01) |
| F16L 5/08 | (2006.01) |
| H02G 3/30 | (2006.01) |
| B64D 45/02 | (2006.01) |
| F16L 5/02 | (2006.01) |

(52) U.S. Cl.
CPC .................. F17C 5/06 (2013.01); F16L 5/08 (2013.01); H02G 3/24 (2013.01); B64D 45/02 (2013.01); F16L 5/027 (2013.01); F17C 2203/0658 (2013.01); F17C 2205/0146 (2013.01); F17C 2205/0173 (2013.01); F17C 2205/0184 (2013.01); F17C 2205/037 (2013.01); F17C 2270/0139 (2013.01)

(58) Field of Classification Search
CPC ..... F16L 5/027; F16L 5/06; F16L 5/08; F16L 27/02; B64D 45/02

USPC ............ 248/59, 70; 285/139.1, 139.2, 139.3
See application file for complete search history.

(56) References Cited

U.S. PATENT DOCUMENTS

| | | | |
|---|---|---|---|
| 4,630,789 A | 12/1986 | Rosenberg | |
| 4,654,747 A | 3/1987 | Covey | |
| 4,971,268 A | 11/1990 | Dobrowski et al. | |
| 5,967,567 A | 10/1999 | Nordstrom | |
| 6,119,305 A | * 9/2000 | Loveall | F16L 5/10 |
| | | | 16/2.2 |

(Continued)

FOREIGN PATENT DOCUMENTS

| | | |
|---|---|---|
| EP | 3103724 A1 | 12/2016 |
| WO | 2014126655 A1 | 8/2014 |

OTHER PUBLICATIONS

Original and Translation of DE 29502331 U1; Kwade, Betonwerk; Jun. 27, 1996.*

(Continued)

*Primary Examiner* — Paul J Gray
(74) *Attorney, Agent, or Firm* — Yee & Associates, P.C.

(57) ABSTRACT

A transport element support assembly comprises a front plate, a back plate, and a grommet. The front plate has a first opening and a first set of holes. The back plate has a second opening and a second set of holes. A chamber is formed by the first opening and the second opening and is configured to hold a transport element. The grommet is positioned within the chamber. The transport element support assembly formed by the front plate, the back plate, and the grommet is configured to provide electrical isolation between the transport element and an aircraft structure.

20 Claims, 14 Drawing Sheets

(56) References Cited

U.S. PATENT DOCUMENTS

| | | | |
|---|---|---|---|
| 6,173,997 B1 * | 1/2001 | Nordstrom | F16L 5/06 |
| | | | 285/139.1 |
| 7,681,923 B2 | 3/2010 | Negley et al. | |
| 7,770,848 B2 | 8/2010 | Johnson et al. | |
| 8,894,014 B2 | 11/2014 | Yonezawa | |
| 2006/0099843 A1 | 5/2006 | Fullner et al. | |
| 2012/0012709 A1 | 1/2012 | Yonezawa | |
| 2014/0232103 A1 * | 8/2014 | Waugh | B64D 45/02 |
| | | | 285/48 |

OTHER PUBLICATIONS

European Patent Office Extended Search Report, dated Sep. 19, 2018, regarding U.S. Appl. No. 18/178,488.5, 8 pages.

\* cited by examiner

TRANSPORT ELEMENT SUPPORT ASSEMBLY

BACKGROUND INFORMATION

1. Field

The present disclosure relates generally to transport elements for aircraft applications. More specifically, the present disclosure relates to a transport element support assembly that maintains electrical isolation between a transport element and a supporting structure and secures the transport element to the supporting structure.

2. Background

Various transport systems are used during operation of an aircraft to move fluid or electricity from one place to another. When these transport systems contain fluid, that fluid may be fuel, hydraulic fluid, or gas. The fluid is often stored in tanks and moves through transport elements running about the aircraft. The transport elements pass through openings in support structures in their path.

During operation, the aircraft may be exposed to electromagnetic events. To protect systems from decompensation, combustion, and damage, Federal Aviation Administration regulations require aircraft manufacturers to ensure that no sparking occurs in flammable zones of the aircraft. To comply with these regulations, aircraft manufacturers must ground or isolate metal objects in the flammable zones. In many cases, assemblies having electrically isolating material are installed around transport elements to prevent sparking.

Transport systems also have separate fittings used to support and restrain the transport element as it flexes under the conditions of aircraft operation. Hundreds of these fittings are installed in an aircraft. A fitting may contain multiple parts that must be aligned and connected separately before system installation can begin. Each of these parts must adhere to predetermined electromagnetic effect requirements. Positioning and alignment of each assembly takes innumerable hours of manpower. Further, the number of parts involved may limit the structural support capability of the fitting. Manufacturing defects in the tube, the fitting, or the electrically isolating assembly may cause misalignment, resulting in more rework than desired.

Therefore, it would be desirable to have a method and apparatus that takes into account at least some of the issues discussed above, as well as other possible issues.

SUMMARY

An illustrative embodiment of the present disclosure provides a transport element support assembly comprising a front plate, a back plate, and a grommet. The front plate has a first opening and a first set of holes. The back plate has a second opening and a second set of holes. A chamber is formed by the front plate and the back plate and is configured to hold a transport element. The grommet is positioned within the chamber. The tube support assembly formed by the front plate, the back plate, and the grommet is configured to provide electrical isolation between the transport element and an aircraft structure.

Another illustrative embodiment of the present disclosure provides a method for stabilizing a transport element in an aircraft structure. A transport element support assembly is positioned around the transport element. The transport element support assembly comprises a front plate, a back plate, and a grommet. The front plate has a first opening and a first set of holes. The back plate has a second opening and a second set of holes. A chamber is formed by the front plate and the back plate and configured to hold the transport element. The grommet is positioned within the chamber. The transport element support assembly is configured to provide electrical isolation between the transport element and the aircraft structure. The transport element is positioned in a hole in the aircraft structure.

A further illustrative embodiment of the present disclosure provides a fluid system for an aircraft comprising a tube and a tube support assembly. Fluid flows through the tube. The tube support assembly comprises a front plate, a back plate, and a grommet. The front plate has a first opening and a first set of holes. The back plate has a second opening and a second set of holes. A chamber is formed by the front plate and the back plate and configured to hold the tube. The grommet is positioned within the chamber. The tube support assembly formed by the front plate, the back plate, and the grommet is configured to provide electrical isolation between the tube and an aircraft structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing process for electrically isolating and supporting transport elements in aircraft is often more expensive and time consuming than desired. Current solutions employ one assembly that provides electrical isolation for the transport element and another fitting with multiple parts that supports and restrains the transport element within its surrounding structure.

Manually aligning and connecting multi-piece, complicated fittings takes significant assembly time. Positioning of the fitting may be difficult when installed in an aircraft structure. Any one of these parts may be misaligned beyond selected tolerances, slowing down the aircraft manufacturing process.

Misalignment of tubing upstream in the installation process may result in problems when attempting to reach a desired fit for a transport element running through the support structure. For example, if holes in the supporting structure are not drilled correctly, installation of the assembly may shift the transport element such that the desired level of preload reduction cannot be achieved. As another example, upstream installation offsets may result in transport elements that are out of alignment, resulting in rework.

Moreover, each part of an assembly must adhere to specific electromagnetic effect requirements. As a result, it may take more time than desired to design, manufacture, and implement these parts.

The disclosed embodiments relate to a transport element support assembly that combines electromagnetic isolation and structural support. The embodiments can be used in a wide variety of aircraft applications for stabilizing and protecting transport systems from electromagnetic effects.

Figure 1:
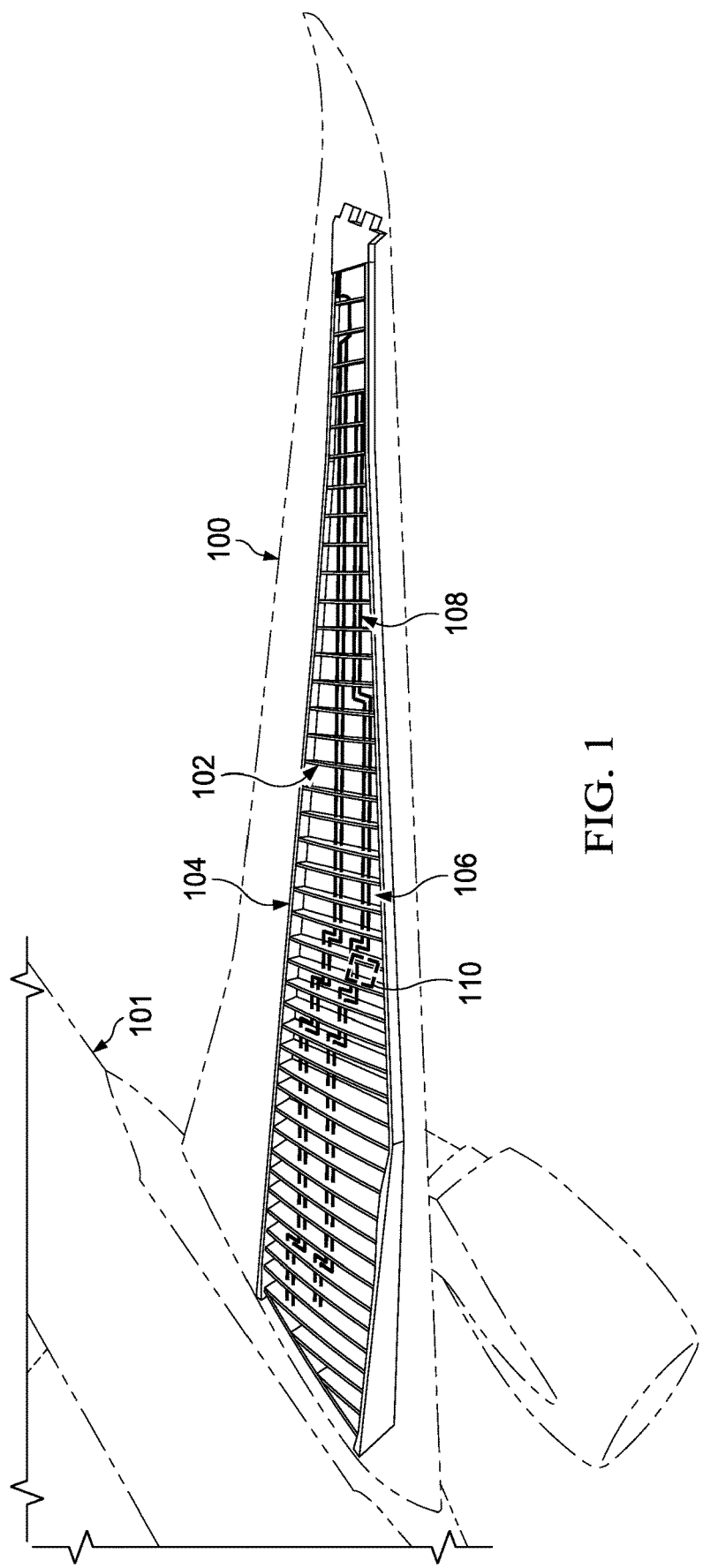
FIG. 1 is an illustration of a perspective view of a wing of an aircraft in accordance with an illustrative embodiment.

With reference now to the figures and, in particular, with reference to FIG. 1, an illustration of a perspective view of a wing of an aircraft is depicted in accordance with an illustrative embodiment. Wing 100 in aircraft 101 has ribs 102 and spars 104. Transport system 106 runs through wing 100. Transport system 106 has transport elements 108. Transport elements 108 carry fluid through wing 100 in this illustrative example. In other illustrative examples, transport elements 108 may carry electricity or some other medium.

Transport elements 108 pass through ribs 102 in this illustrative example. Transport elements 108 may be secured to ribs 102 using transport element support assemblies (not shown in this view). Each one of the transport element support assemblies provides electrical isolation between transport element 108 and ribs 102. The assemblies also provide structural support to hold transport element 108 in place.

Section 110 of wing 100 shows a portion of transport system 106. Components in section 110 are shown in greater detail in FIG. 9.

Figure 2:
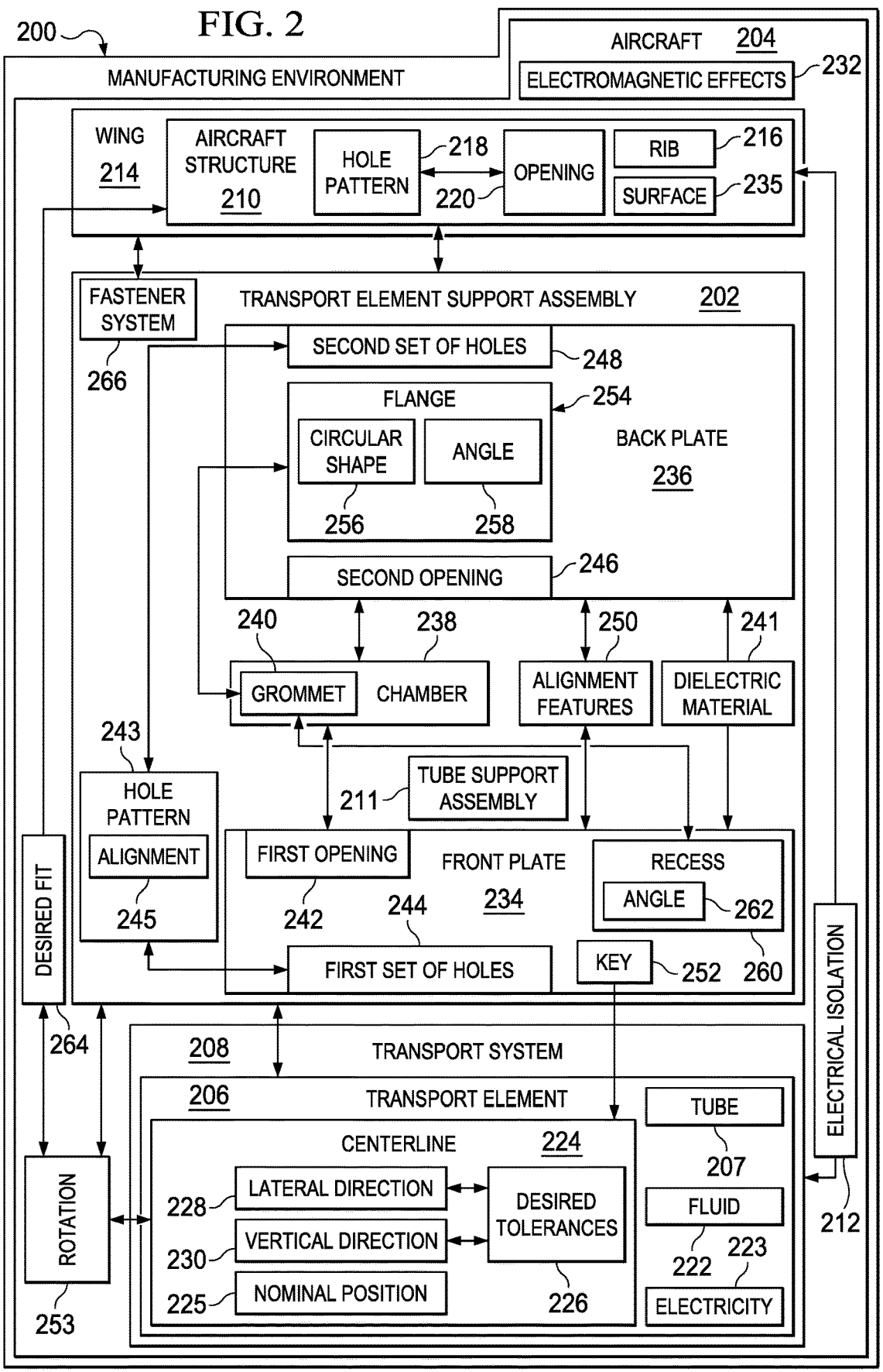
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where transport element support assembly 202 may be manufactured for use in aircraft 204. Transport element support assembly 202 may then be installed in aircraft 204. Specifically, transport element support assembly 202 may be positioned around transport element 206 in transport system 208 and secured to aircraft structure 210 to provide electrical isolation 212 between transport element 206 and aircraft structure 210.

As depicted, transport system 208 comprises a series of transport elements 206 configured to move a medium from one place in the aircraft to another. That medium may take the form of, for example, without limitation, fluid, electricity, or some other medium. When fluid flows through transport system 208, transport element 206 takes the form of tube 207 and transport element support assembly 202 takes the form of tube support assembly 211.

In an illustrative example, aircraft structure 210 may be any type of aerospace structure through which transport elements in transport system 208 pass. Aircraft structure 210 is located in wing 214 in this illustrative example. In other examples, aircraft structure 210 may be located in an engine, a compartment, a housing, a tank, a cabin, a waste system, or other portions of aircraft 204.

Aircraft structure 210 may be a rib, a spar, an engine nacelle, a muffler, a panel, a portion of the fuselage, or any other type of aerospace structure where tube support assembly 202 may be used. In this illustrative example, aircraft structure 210 takes the form of rib 216.

Aircraft structure 210 has hole pattern 218 and opening 220. Opening 220 is configured for transport element 206 to pass through. Hole pattern 218 is formed from a number of holes surrounding opening 220. As used herein, "a number of" when used with reference to items means one or more items. Thus, a number of holes include one or more holes. Hole pattern 218 in aircraft structure 210 has three holes in this illustrative example.

At least one of fluid 222 or electricity 223 flows through transport element 206. Fluid 222 may be selected from at least one of a fuel, a gas, a hydraulic fluid, or some other type of fluid. The shape, size, diameter, wall thickness, and material for transport element 206 may be selected to comply with aircraft regulations or manufacturing specifications, depending on the type of fluid 222 flowing through transport element 206.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, transport element 206 has centerline 224. Centerline 224 is the axis that runs longitudinally along transport element 206 through the midpoint of its diameter. Centerline 224 may have nominal position 225. Nominal position 225 is a desired position for transport element 206 within opening 220 in aircraft structure 210. Nominal position 225 represents a position where there is no shift in centerline 224.

During installation of transport element 206 in aircraft structure 210, centerline 224 may be adjusted in one or more direction. For example, to ensure transport element 206 is installed in aircraft structure 210 to have desired tolerances 226, centerline 224 of transport element 206 may be moved in at least one of lateral direction 228 or vertical direction 230. Desired tolerances 226 represent tolerances for centerline 224 of transport element 206 that maintain a desired location for transport element 206 within aircraft structure 210.

Electrical isolation 212 is desirable to prevent sparking from electromagnetic effects 232. Electromagnetic effects 232 may result from an electromagnetic event such as a lightning strike during operation of aircraft 204. Electromagnetic effects 232 may result from other events as well.

In this illustrative example, transport element support assembly 202 comprises front plate 234, back plate 236, and grommet 240. Chamber 238 is formed by the shape of front plate 234 and back plate 236 when put together.

Front plate 234 and back plate 236 may comprise dielectric material 241. Dielectric material 241 may be selected from at least one of a polyether ether ketone, a ceramic, or other suitable materials.

As depicted, transport element support assembly 202 formed by front plate 234, back plate 236, and grommet 240 is configured to provide electrical isolation 212 between transport element 206 and aircraft structure 210. Transport element support assembly 202 is also configured to secure transport element 206 within aircraft structure 210.

Front plate 234 has first opening 242 and first set of holes 244. Back plate 236 has second opening 246 and second set of holes 248. Back plate 236 is configured to be positioned against surface 235 of aircraft structure 210 when installed.

Hole pattern 243 is formed by alignment 245 of first set of holes 244 and second set of holes 248. Hole pattern 243 is configured to match hole pattern 218 in aircraft structure 210.

Chamber 238 is formed when front plate 234 and back plate 236 interface with one another. Chamber 238 is configured to hold grommet 240. In other words, transport element 206 passes through grommet 240. Grommet 240 may be comprised of a material selected from at least one of a metal, a rubber, polytetrafluoroethylene, or some other suitable material.

Transport element support assembly 202 also may include alignment features 250 and key 252. Alignment features 250 are configured to align front plate 234 to back plate 236 such that first set of holes 244 remains aligned to second set of holes 248. Alignment features 250 may include pins, tabs, clips, flanges, interference fit structures, bolts, collars, or other types of alignment features.

Alignment features 250 ensure that rotation 253 of tube support assembly 202 rotates front plate 234, back plate 236, and grommet 240 simultaneously. For example, during installation, grommet 240 may be placed in chamber 238 when front plate 234 and back plate 236 are put together. Twisting of front plate 234 and back plate 236 may result in locking the two pieces together such that tube support assembly 202 may be rotated as one part.

Key 252 represents a configuration of transport element support assembly 202 where centerline 224 of tube 206 is in nominal position 225. In this illustrative example, key 252 is an indicator of positioning with reference to centerline 224. Key 252 may be a number, a slit, a letter, a symbol, or some other suitable type of indicator.

In this illustrative example, back plate 236 may have flange 254 with circular shape 256 and angle 258 configured to hold grommet 240 in place. Front plate 234 may have recess 260 having angle 262 configured to hold grommet 240 in place. For example, circular shape 256 and angle 258 of flange 254 coupled with recess 260 and angle 262 in front plate 234 may form a shape for chamber 238 such that grommet 240 fits securely within chamber 238.

Rotation 253 of transport element support assembly 202 as a whole adjusts centerline 224 of transport element 206 in at least one of lateral direction 228 or vertical direction 230 in this illustrative example. In particular, rotation 253 of transport element support assembly 202 adjusts centerline 224 of transport element 206 in at least one of lateral direction 228 or vertical direction 230 within selected tolerances 226. Rotation 253 creates desired fit 264 between transport element support assembly 202 and aircraft structure 210.

In an illustrative example, rotation 253 may be needed to create desired fit 264 on fasteners (e.g., studs) placed in the holes in aircraft structure 210. For instance, if upstream manufacturing defects or misalignment creates problems with fitting, transport element support assembly 202 may simply be rotated to attain desired fit 264, without additional rework.

In some examples, transport element support assembly 202 may include fastener system 266. Fastener system 266 may be configured to secure transport element support assembly 202 to aircraft structure 210 after rotation 253 is completed. In an illustrative example, fastener system does not touch transport element 206. As a result, the components in fastener system 266 do not need electromagnetic effect protection.

Fastener system 266 may include one or more fasteners, collars, and other suitable components. For example, fastener system 266 may include the studs placed through holes forming hole pattern 218 in aircraft structure 210. During installation, transport element support assembly 202 may be placed on the studs in a desired manner. Once placed on the studs, transport element support assembly 202 may be further secured to aircraft structure 210 using collars in fastener system 266.

With an illustrative embodiment, manufacturing and installation of transport system 208 may take less time than with currently used systems. Transport element support assembly 202 is both a clamp and a bracket that provides electromagnetic isolation and support for transport element 206 in one mechanism. Additionally, transport element support assembly 202 is designed such that it may be rotated to create a desired fit within selected tolerances for centerline 224 of transport element 206, taking into account possible manufacturing and installation defects.

An illustrative embodiment eliminates the need for various parts to have separate electromagnetic effect protection. Electromagnetic isolation is achieved from transport element support assembly 202 alone. Hole pattern 243 in transport element support assembly 202 may be designed and adjusted to provide a desired location for the transport element. The distance between holes and the number of holes in hole pattern 243 may be changed to provide a desired level of performance, centerline shift, and ease of install, depending on the particular implementation.

Figure 3:
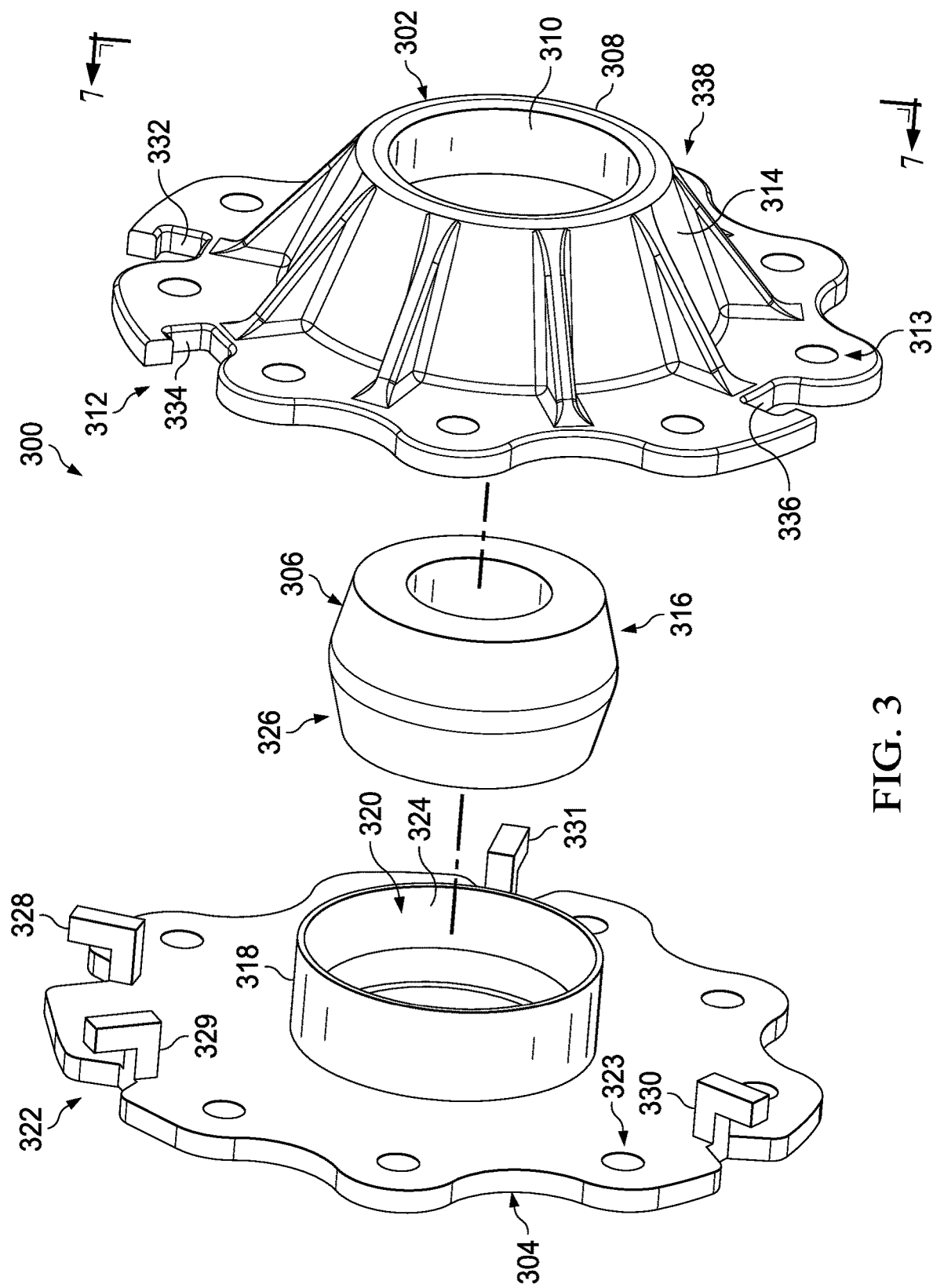
FIG. 3 is an illustration of an exploded view of pieces of a tube support assembly in accordance with an illustrative embodiment.

With reference next to FIG. 3, an illustration of an exploded view of pieces of a tube support assembly is depicted in accordance with an illustrative embodiment. FIG. 3 depicts an example of one implementation for transport element support assembly 202 shown in block form in FIG. 2.

As depicted, tube support assembly 300 has front plate 302, back plate 304, and grommet 306. Front plate 302, back plate 304, and grommet 306 are illustrative examples of implementations for front plate 234, back plate 236, and grommet 240 in FIG. 2, respectively.

Front plate 302 has flange 308, opening 310, slits 312, and holes 313. In this illustrative example, flange 308 protrudes from the surface of front plate 302. Flange 308 protrudes at angle 314. Angle 314 has a shape that corresponds to the shape of portion 316 of grommet 306 such that grommet 306 interfaces securely with front plate 302.

In this illustrative example, back plate 304 has flange 318, opening 320, alignment features 322, and holes 323. Flange 318 protrudes from the surface of back plate 304. Flange 318 protrudes at angle 324. Angle 324 has a shape that corresponds to the shape of portion 326 of grommet 306 such that grommet 306 interfaces securely with back plate 304. Both front plate 302 and back plate 304 each have nine holes in this illustrative example, but other numbers are possible.

Alignment features 322 include tab 328, tab 329, tab 330, and tab 331. Tab 328, tab 329, tab 330, and tab 331 in back plate 304 correspond to slit 332, slit 334, slit 336, and slit 338, respectively, in front plate 302. During installation, grommet 306 is positioned in the chamber formed by front plate 302 and back plate 304. Each tab in back plate 304 is placed within its corresponding slit in front plate 302. Front plate 302 is then rotated counterclockwise to align holes 313 with holes 323.

Figure 4:
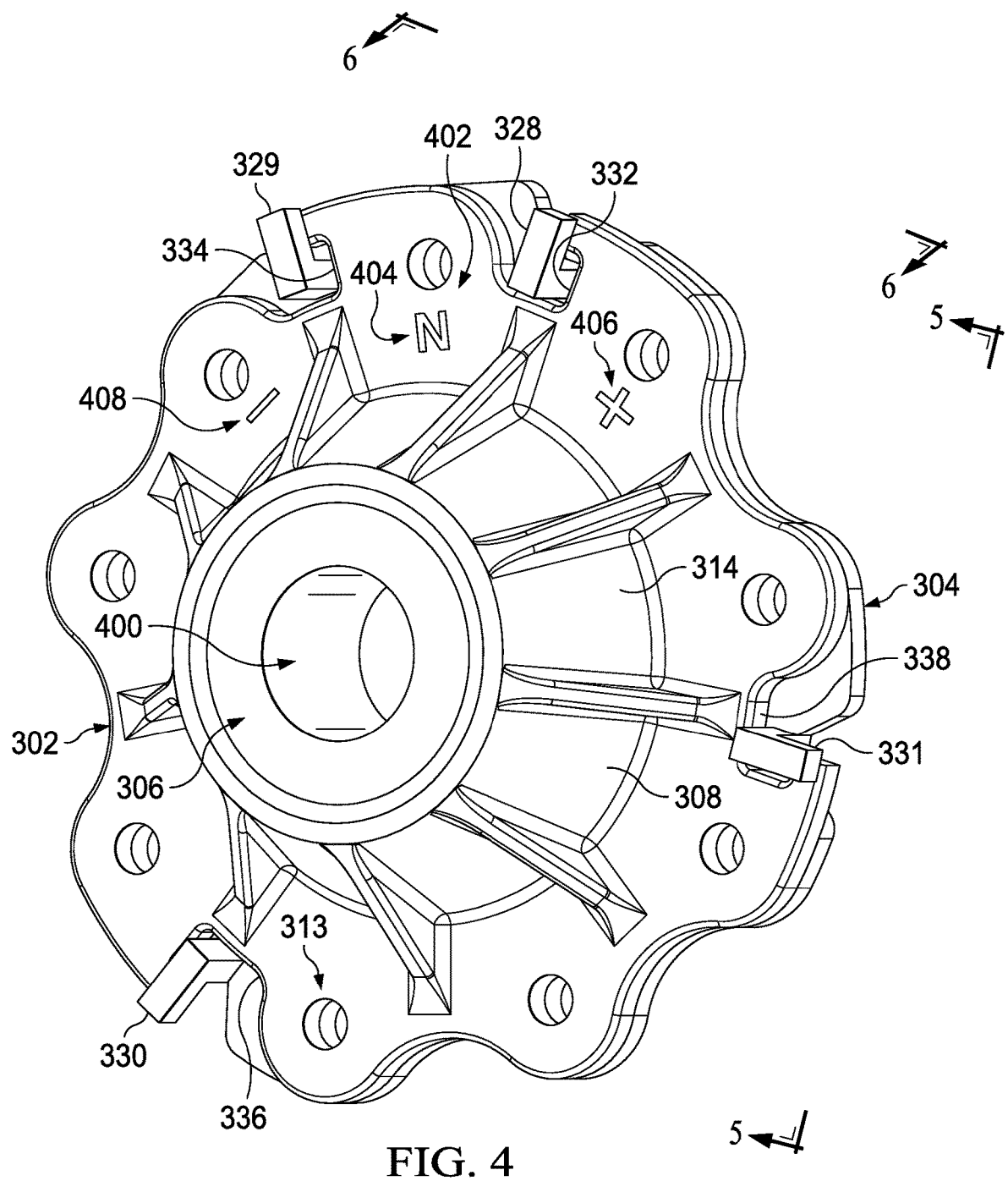
FIG. 4 is an illustration of a perspective view of a tube support assembly in accordance with an illustrative embodiment.
Figure 5:
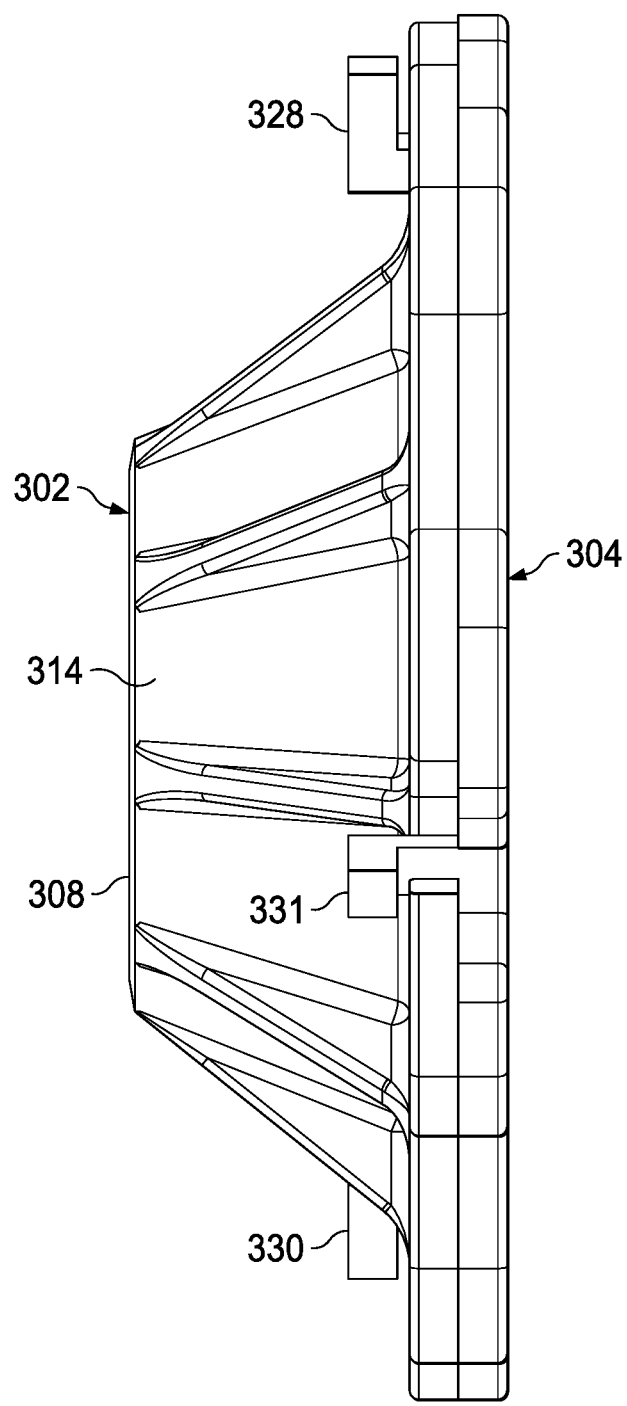
FIG. 5 is an illustration of a side view of a tube support assembly in accordance with an illustrative embodiment.
Figure 6:
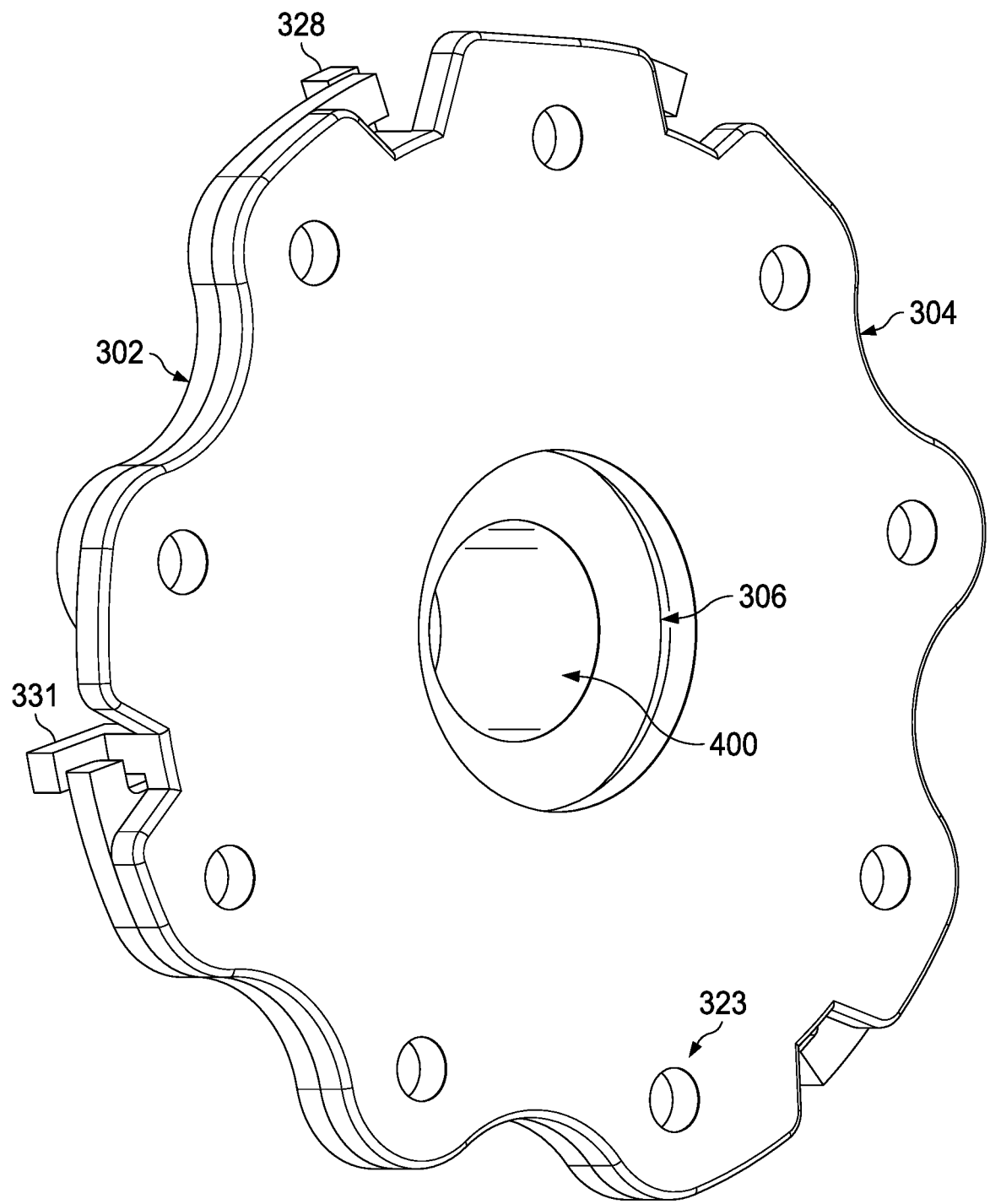
FIG. 6 is an illustration of a back perspective view of a tube support assembly in accordance with an illustrative embodiment.

FIGS. 4-6 show different views of tube support assembly 300 once it has been aligned. In some cases, front plate 302 and back plate 304 may be locked together allowing all pieces to be rotated as one during installation around a tube passing through an aircraft structure.

FIG. 4 shows a front perspective view of tube support assembly 300 from FIG. 3. Chamber 400 and key 402 are shown in this illustrative example. Chamber 400 is formed by front plate 302 and back plate 304. A tube (not shown) will pass through grommet 306 when installed in an aircraft structure.

As depicted, key 402 has three indicators. Indicator 404 represents the nominal position. If indicator 404 is at the top most position during installation, the centerline of the tube will be in the nominal position.

Indicator 406 represents the positive position while indicator 408 represents the negative position.

FIG. 5 depicts a side view of tube support assembly 300 in the direction of view lines 5-5 in FIG. 4. FIG. 6 depicts a back view of tube support assembly 300 in the direction of view lines 6-6 in FIG. 4.

Figure 7:
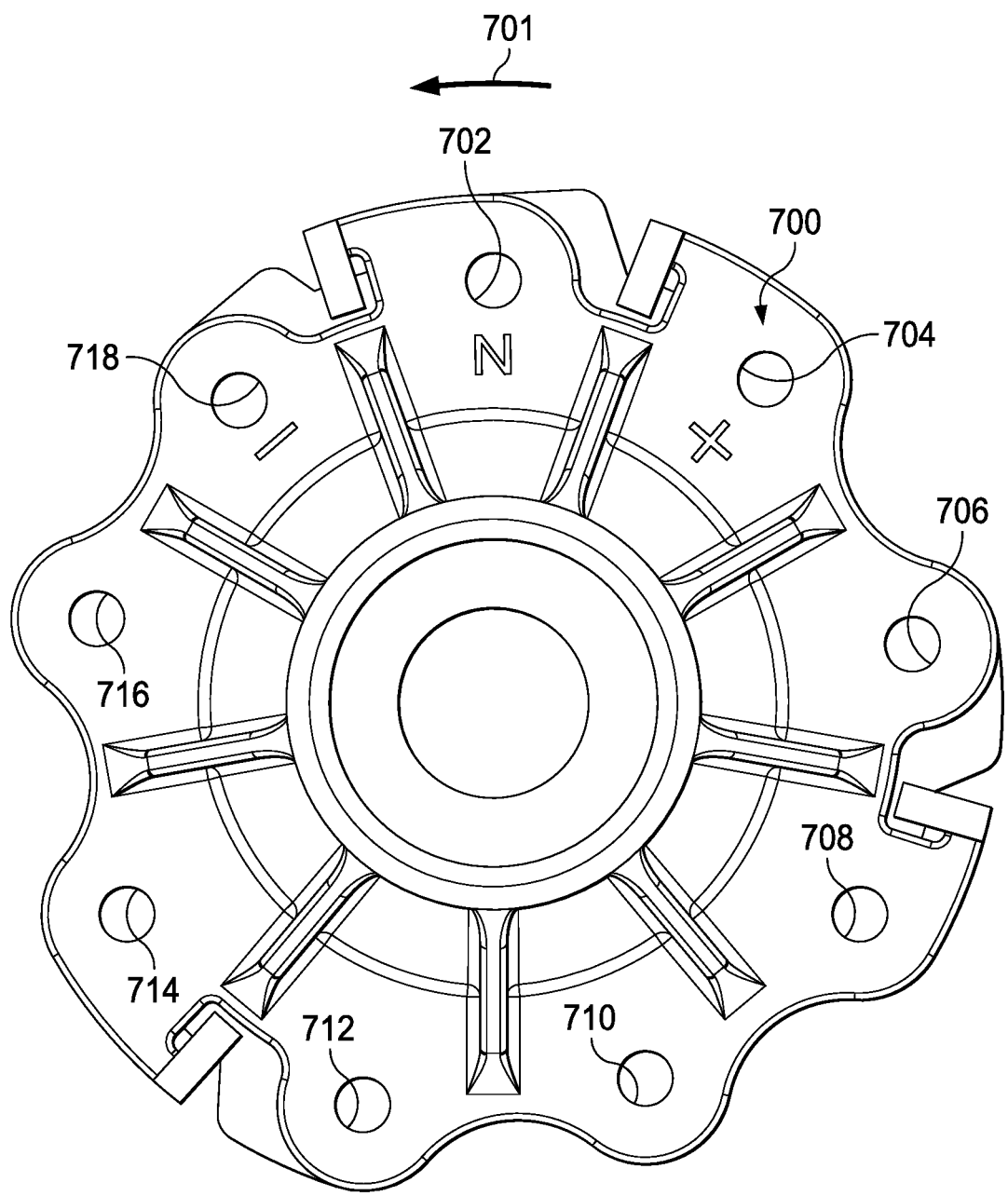
FIG. 7 is an illustration of a front view of a tube support assembly in accordance with an illustrative embodiment.

With reference next to FIG. 7, a front view of tube support assembly 300 is shown in the direction of view lines 7-7 in FIG. 3. As shown in this view, holes 313 and holes 323 have been aligned to form hole pattern 700.

Figure 8:
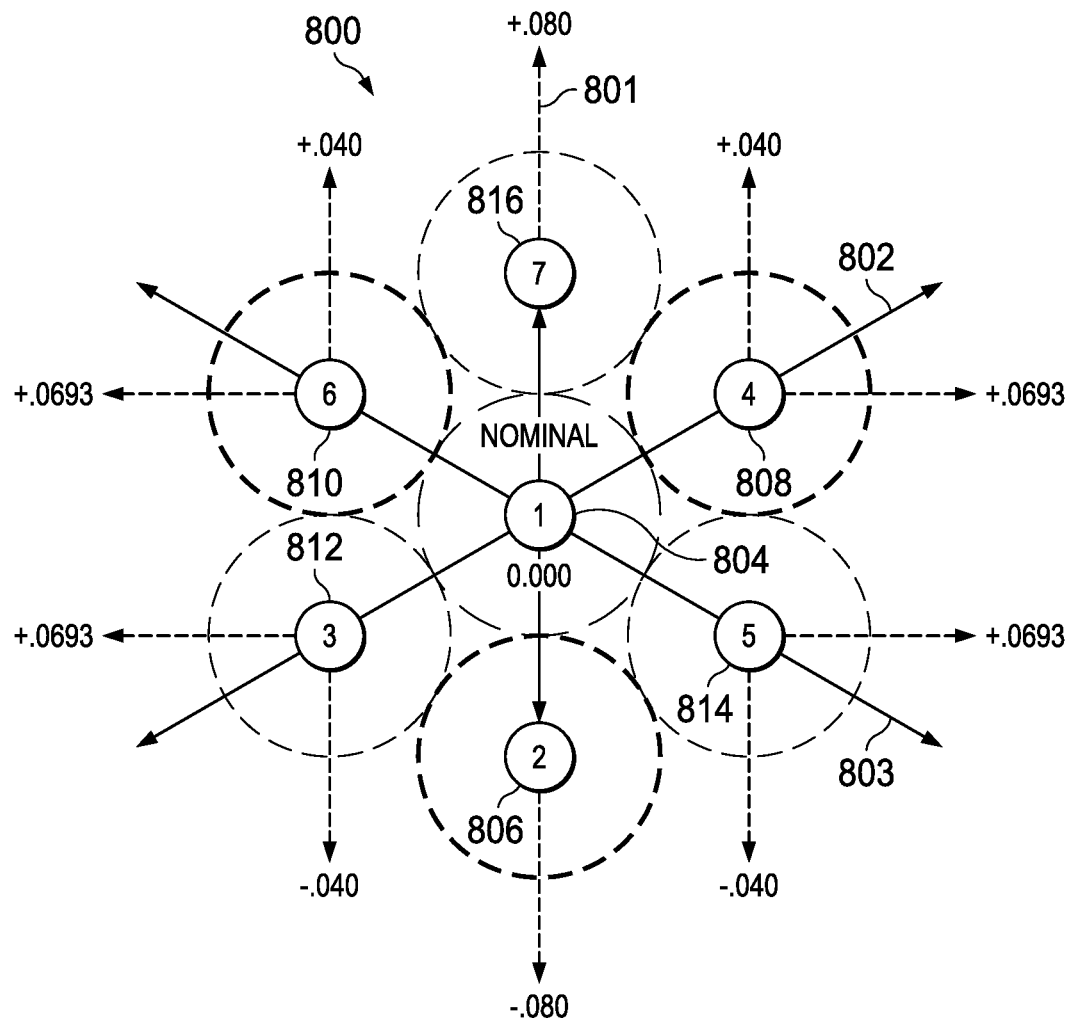
FIG. 8 is an illustration of a graph of tube centerline shift in accordance with an illustrative embodiment.

During installation, tube support assembly 300 may be rotated in the direction of arrow 701 to attain a desired fit on the aircraft structure. FIG. 8 shows a graph of the movement of the centerline of the tube corresponding with each rotation. Graph 800 in FIG. 8 shows centerline movement in both the lateral direction and the vertical direction to achieve transport element location, manufacturing specifications, and support. Graph 800 shows axis 801, axis 802, and axis 803. Axis 801 represents the z-axis, axis 802 represents the x-axis and axis 803 represents the y-axis.

In this illustrative example, tube support assembly 300 is designed such that centerline movement in the lateral direction is limited to +/−0.0693 inches. Movement in the vertical direction is limited to +/−0.08 inches. In other illustrative examples, centerline movement in either direction may be limited to more or less, depending on the particular implementation.

In this illustrative example, hole pattern 700 includes hole 702, hole 704, hole 706, hole 708, hole 710, hole 712, hole 714, hole 716, and hole 718. Hole pattern 700 is split into three sets in this illustrative example. Each set has three holes that correspond to a hole pattern in an aircraft structure. In particular, a set of holes will fit on studs installed in an aircraft structure. Only three studs are used during installation in this illustrative example. Accordingly, only three holes are used. The other holes remain empty in this particular example.

As depicted, hole 702, hole 708, and hole 714 form a first set of holes. If any of these holes are aligned at the top most position of tube support assembly 300 during installation, the centerline of the tube will be in nominal position 804.

Hole 704, hole 710, and hole 716 form a second set of holes. When hole 704 is in the uppermost position, the centerline of the tube is in position 806. When hole 710 is in the uppermost position, the centerline of the tube is in position 808. When hole 716 is in the uppermost position, the centerline of the tube will be in position 810.

Hole 706, hole 712, and hole 718 form a third set of holes. When hole 706 is in the uppermost position, the centerline of the tube is in position 812. When hole 712 is in the uppermost position, the centerline of the tube is in position 814. When hole 718 is in the uppermost position, the centerline of the tube is in position 816.

Tube support assembly 300 as depicted in FIGS. 3-7 may be configured for use with tubes carrying hydraulic fluid. The design of each tube support assembly may be modified depending on the type of fluid in each tube.

Figure 9:
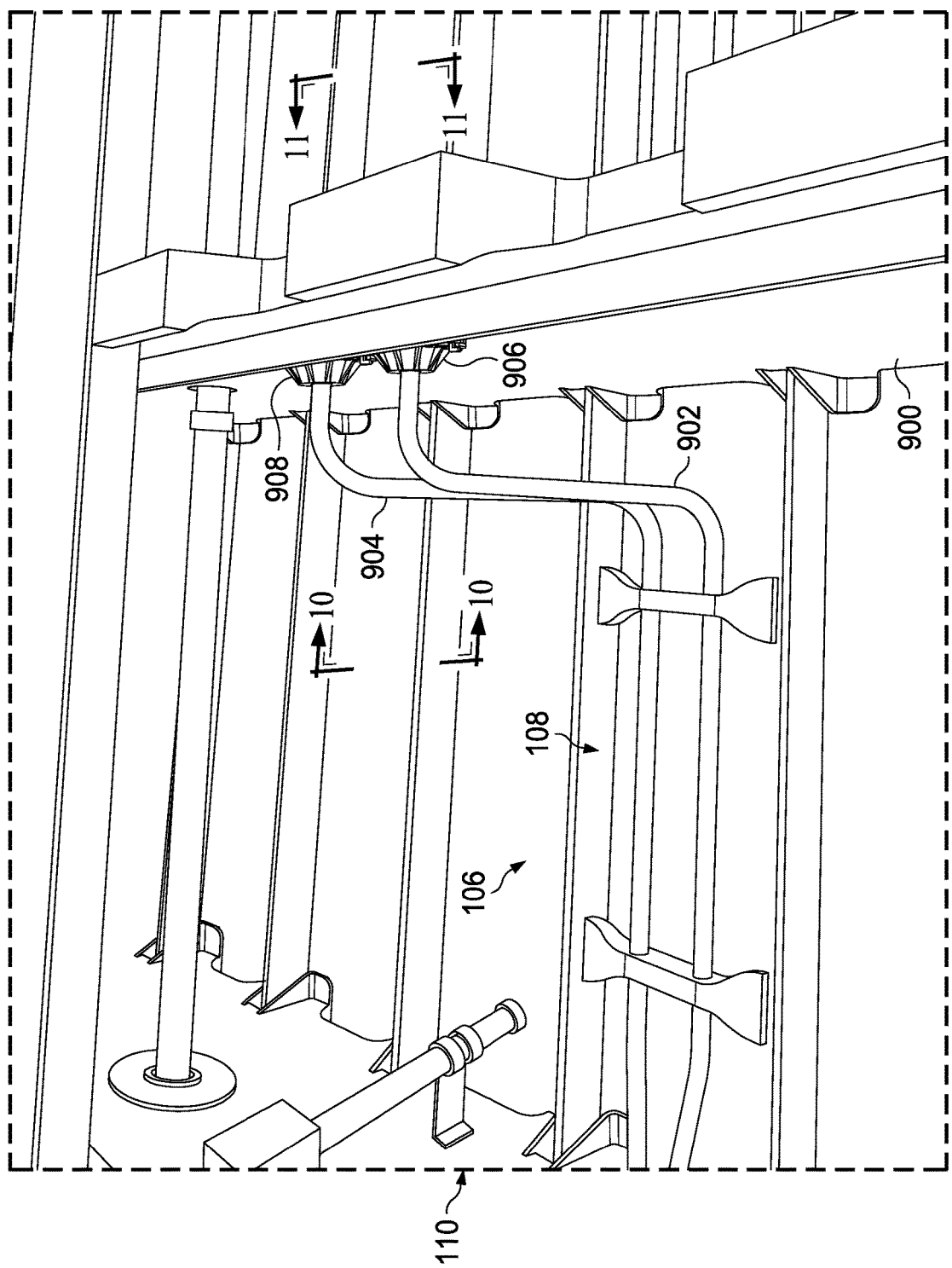
FIG. 9 is an illustration of a section of a fluid system installed in a wing of an aircraft in accordance with an illustrative embodiment.

Turning now to FIG. 9, an illustration of a section of a fluid system installed in a wing of aircraft is depicted in accordance with an illustrative embodiment. FIG. 9 depicts a more-detailed view of section 110 of transport system 106 shown in FIG. 1.

In this illustrative example, transport elements 108 pass through rib 900 in wing 100. Transport elements 108 include tube 902 and tube 904. Tube support assembly 906 has been positioned around tube 902. Tube support assembly 908 has been positioned around tube 904. Tube support assembly 906 and 908 are examples of implementations for transport element support assembly 202 shown in block form in FIG. 2. Both tube support assembly 906 and tube support assembly 908 contain the features and functions depicted with reference to tube support assembly 300 shown in FIGS. 3-7.

Figure 10:
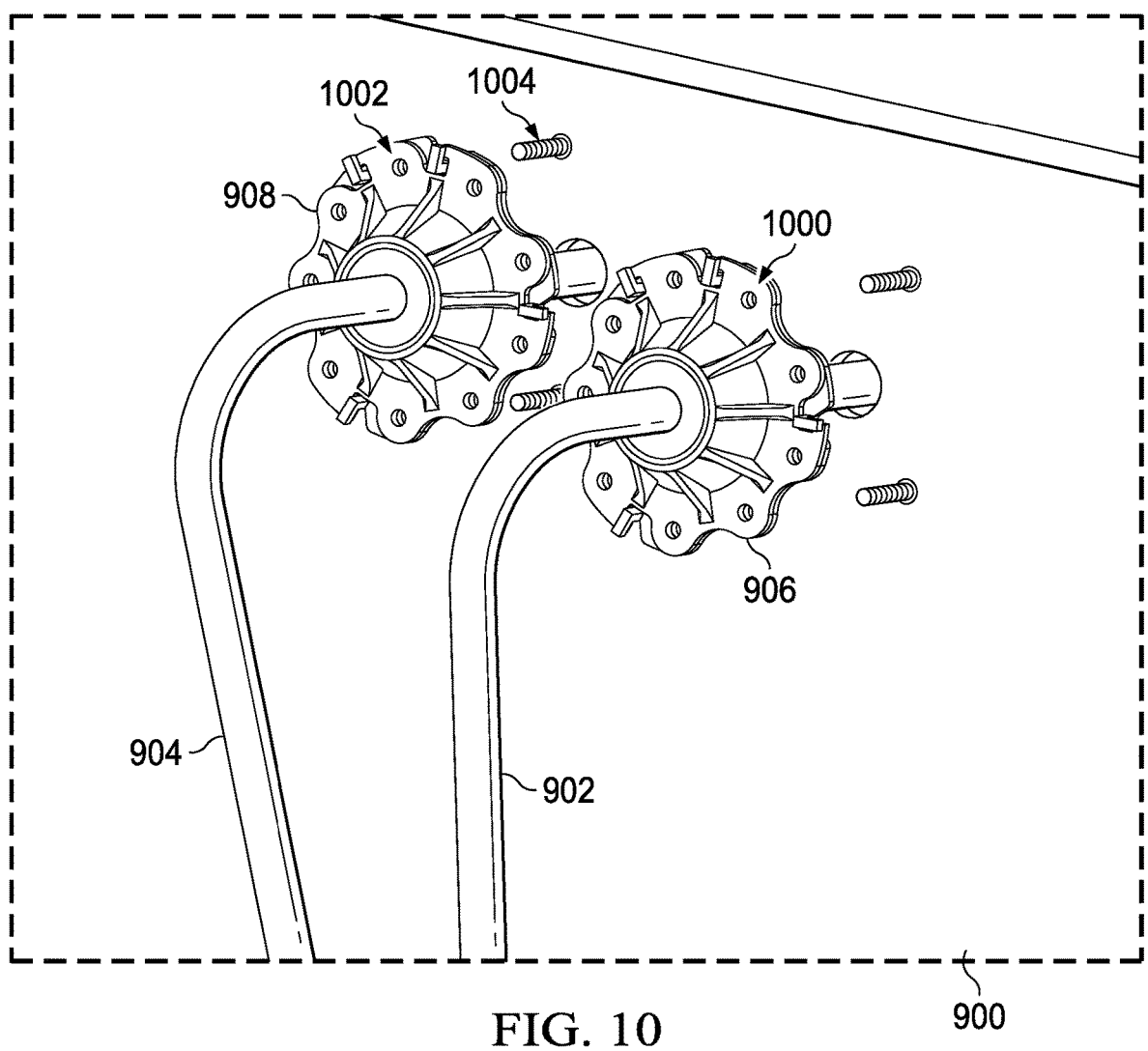
FIG. 10 is an illustration of a more-detailed view of a fluid system positioned in a rib in accordance with an illustrative embodiment.

In FIG. 10, a more detailed view of a transport system positioned in a rib is depicted in accordance with an illustrative embodiment. Transport system 106 is shown in the direction of view lines 10-10 in FIG. 9. Transport system 106 is a fluid system having tubing in this illustrative example.

As depicted, rib 900 has hole pattern 1000 and hole pattern 1002. Tube support assembly 906 may be rotated to create a desired fit for hole pattern 1000, shifting the centerline of tube 902 as necessary and within desired tolerances. Tube support assembly 908 may be rotated to create a desired fit for hole pattern 1002, shifting the centerline of tube 904 as necessary and within desired tolerances.

In this illustrative example, fastener system 1004 is shown installed in rib 900. Fastener system 1004 includes studs placed in hole pattern 1002 of rib 900. Tube support assembly 908 will be aligned with the studs, fit flush against rib 900, and secured with collars in later manufacturing steps.

Figure 11:
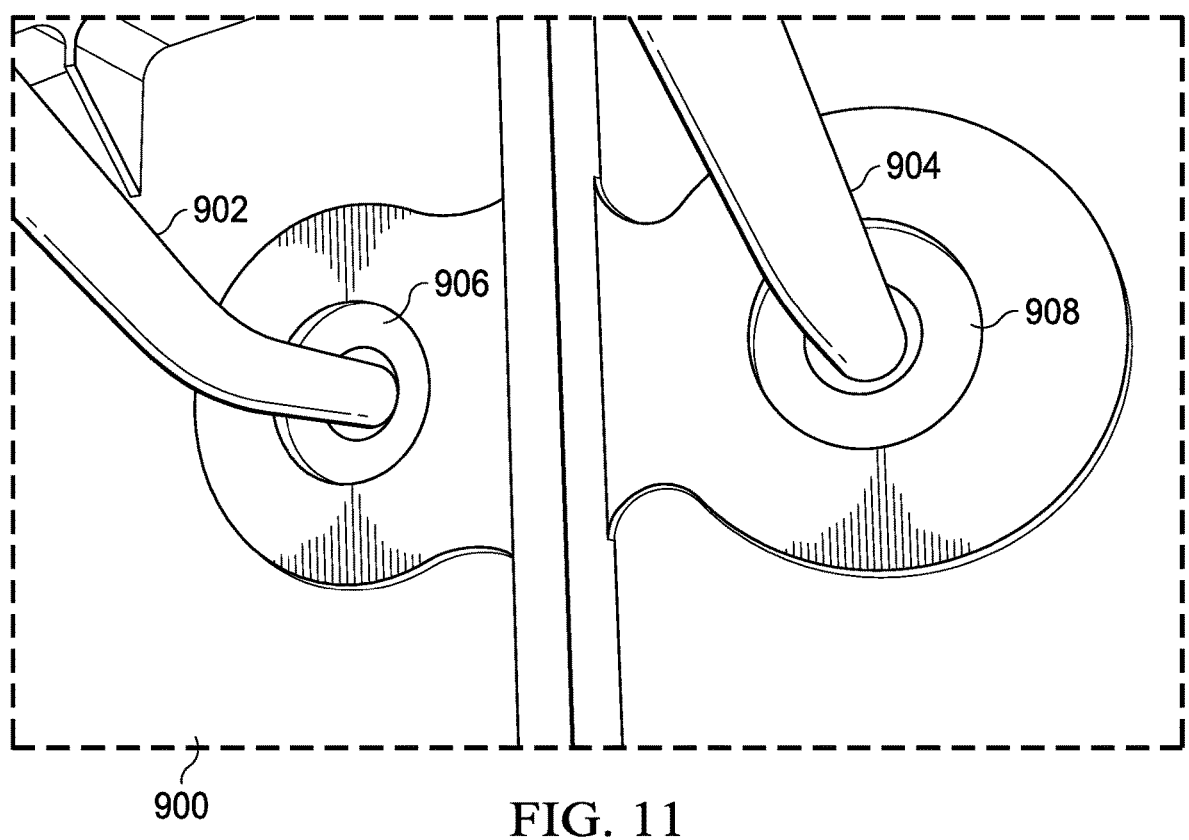
FIG. 11 is an illustration of a back view of tube support assemblies installed in a rib in accordance with an illustrative embodiment.

FIG. 11 depicts a back view of tube support assembly 906 and tube support assembly 908 installed in rib 900. Fluid system 106 is shown in the direction of view lines 11-11 in FIG. 9.

Figure 12:
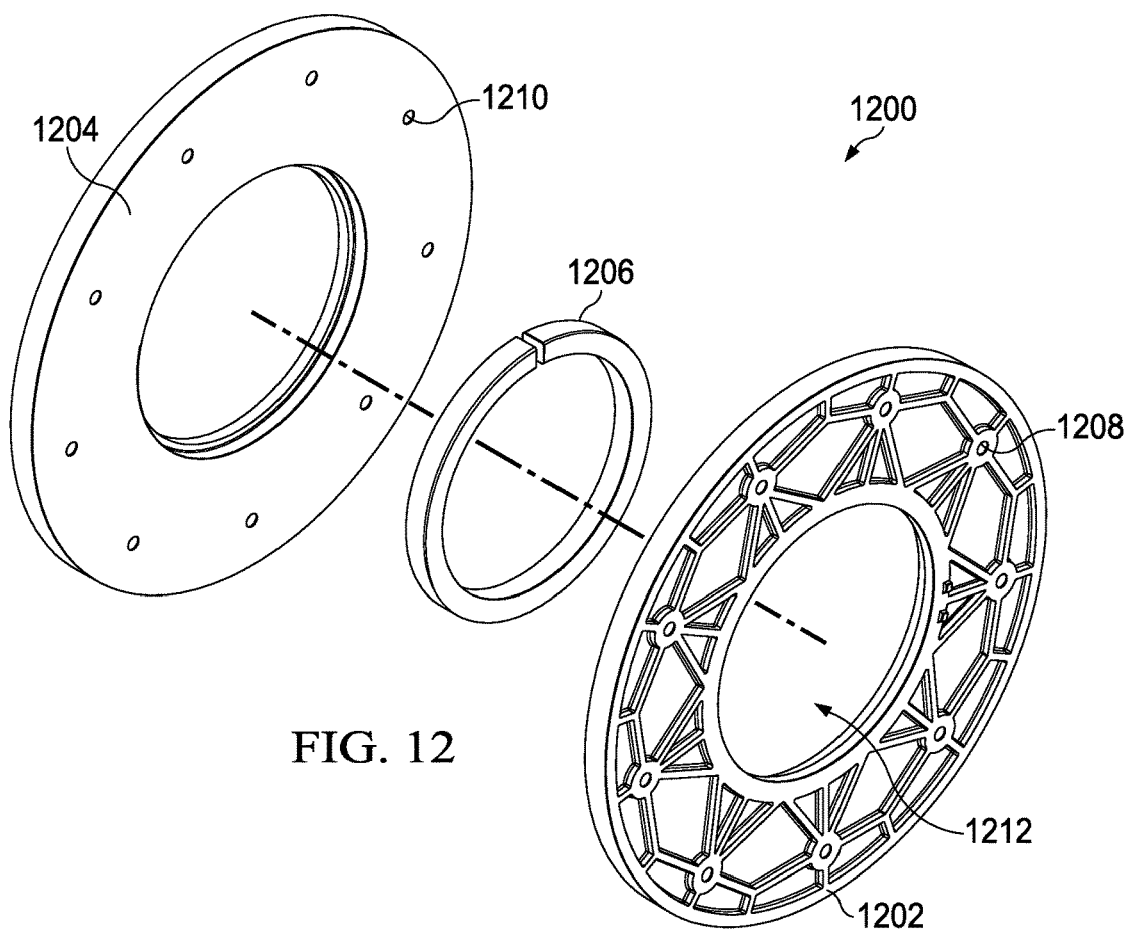
FIG. 12 is an illustration of an alternate implementation for a tube support assembly in accordance with an illustrative embodiment.

Turning next to FIG. 12, an illustration of an alternate implementation for a tube support assembly is depicted in accordance with an illustrative embodiment. Tube support assembly 1200 is another example of an implementation for tube support assembly 202 shown in block form in FIG. 2.

Tube support assembly 1200 includes front plate 1202, back plate 1204, and grommet 1206. Front plate 1202 has holes 1208 and back plate 1204 has holes 1210. The pieces of tube support assembly 1200 are put together such that holes 1208 and holes 1210 create a hole pattern that corresponds to a hole pattern in a rib. Back plate 1204 sits flush on the surface of rib 1300 shown in FIG. 13.

Figure 13:
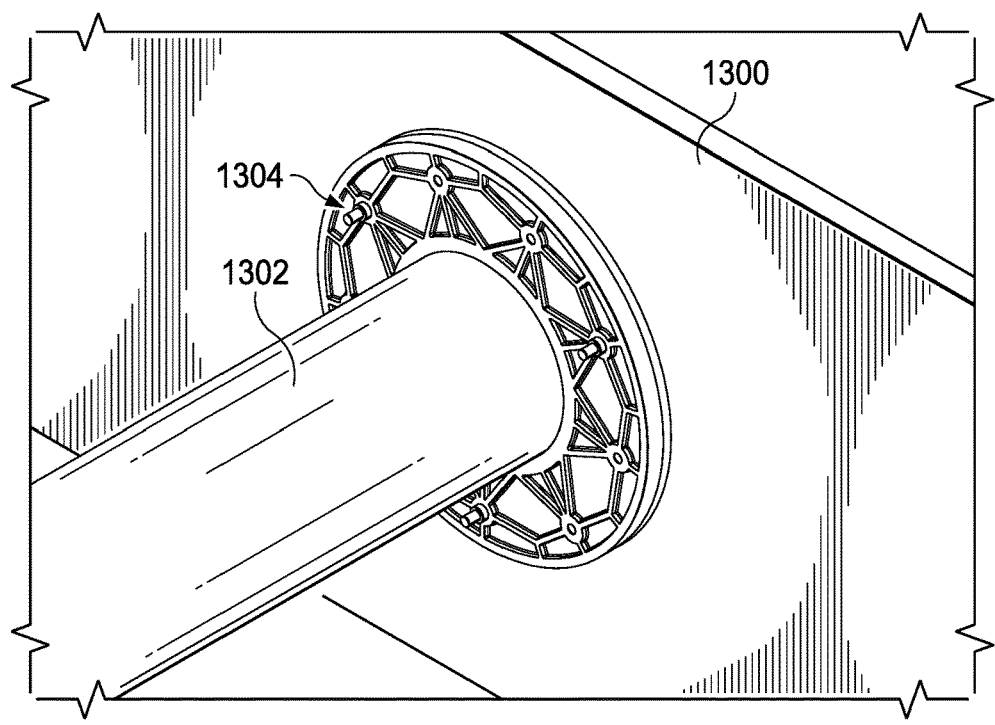
FIG. 13 is an illustration of a tube support assembly installed in a rib in accordance with an illustrative embodiment.

FIG. 13 depicts a tube support assembly installed in a rib in accordance with an illustrative embodiment. Tube 1302 is positioned within chamber 1212 formed by front plate 1202, back plate 1204, and grommet 1206. Tube 1302 may carry fuel in this illustrative example. Accordingly, tube support assembly 1200 may be configured for use with tubes that carry fuel. Tube support assembly 1200 is secured to rib 1300 using fastener system 1304.

Wing 100 in FIG. 1 is only one physical implementation of a platform incorporating transport element support assembly 202 in FIG. 2. Although the examples for an illustrative embodiment are described with respect to an aircraft, an illustrative embodiment may be applied to other types of platforms. Transport element support assembly 202 may be used in any platform where tubing is present. The platform may be, for example, a mobile platform, a stationary platform, a land-based structure, an aquatic-based structure, or a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-13 may be combined with components in FIG. 2, used with components in FIG. 2, or a combination of the two. Additionally, some of the components in FIG. 1 and FIGS. 3-6 may be illustrative examples of how components shown in block form in FIG. 2 may be implemented as physical structures.

Figure 14:
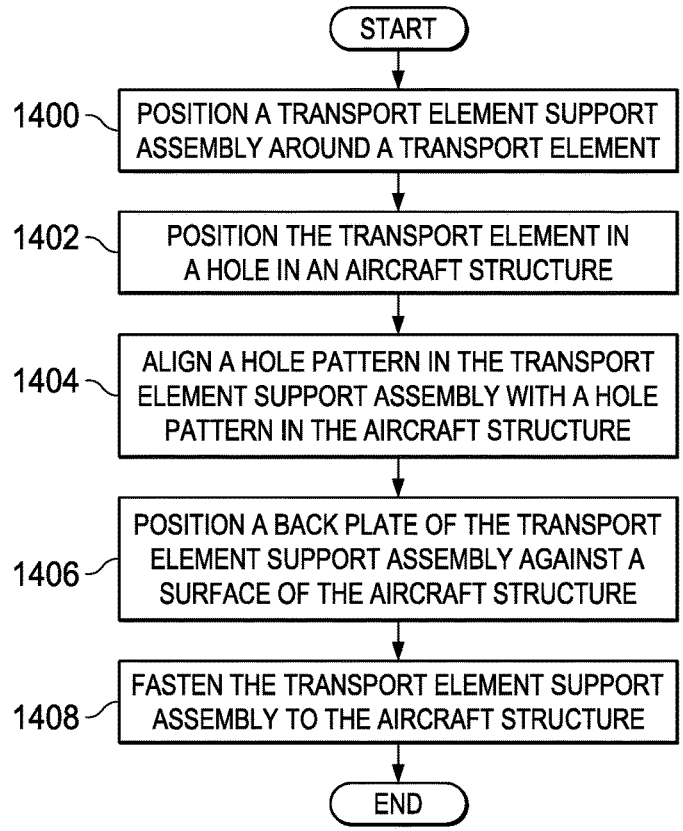
FIG. 14 is an illustration of a flowchart of a process for aligning and stabilizing a tube in an aircraft structure in accordance with an illustrative embodiment.

With reference next to FIG. 14, an illustration of a flowchart of a process for aligning and stabilizing a tube in an aircraft structure is depicted in accordance with an illustrative embodiment. The method depicted in FIG. 14 may be used to install transport element support assembly 202 shown in FIG. 2.

The process begins by positioning a transport element support assembly around a transport element (operation 1400). The transport element support assembly comprises the components described with reference to FIG. 2.

Next, the transport element is positioned in a hole in an aircraft structure (operation 1402). A hole pattern in the transport element support assembly is aligned with a hole pattern in the aircraft structure (operation 1404). Operation 1404 includes rotating the transport element support assembly to find a desired fit. Rotating the transport element support assembly adjusts a centerline of the transport element in at least one of the lateral direction or the vertical direction.

A back plate of the transport element support assembly is positioned against a surface of the aircraft structure (operation 1406). Studs positioned within the holes in the rib pass through holes in the transport element support assembly to hold it in the desired position.

The transport element support assembly is fastened to the aircraft structure (operation 1408), with the process terminating thereafter. Fastening of the transport element support assembly to the aircraft structure occurs after rotation is completed.

Figure 15:
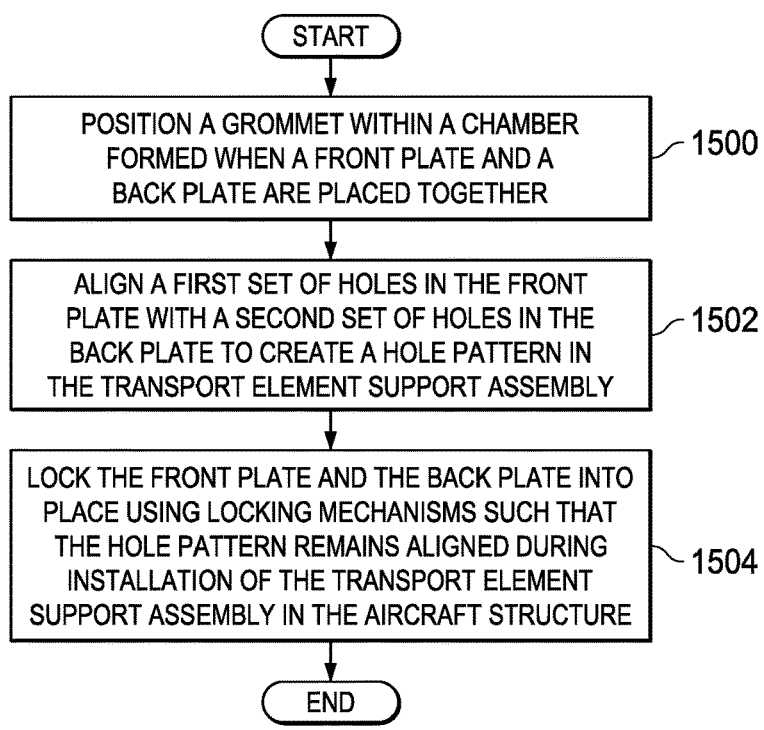
FIG. 15 is an illustration of a flowchart of a process for positioning a transport element support assembly in accordance with an illustrative embodiment.

Turning to FIG. 15, an illustration of a flowchart of a process for positioning a transport element support assembly is depicted in accordance with an illustrative embodiment. The method depicted in FIG. 15 may be used during operation 1404 shown in FIG. 14 to connect components in a transport element support assembly together.

The process begins by positioning a grommet within a chamber formed when a front plate and a back plate are placed together (operation 1500). Next, a first set of holes in the front plate is aligned with a second set of holes in the back plate to create a hole pattern in the transport element support assembly (operation 1502). The front plate and the back plate are then locked into place using locking mechanisms such that the hole pattern remains aligned during installation of the transport element support assembly in the aircraft structure (operation 1504) with the process terminating thereafter.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 16:
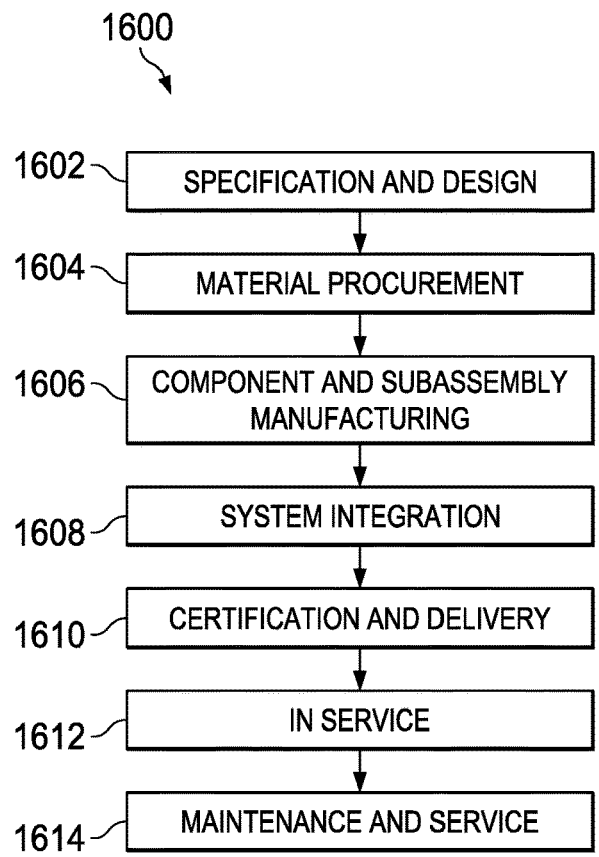
FIG. 16 is an illustration of a block diagram of an aircraft manufacturing and service method in accordance with an illustrative embodiment.
Figure 17:
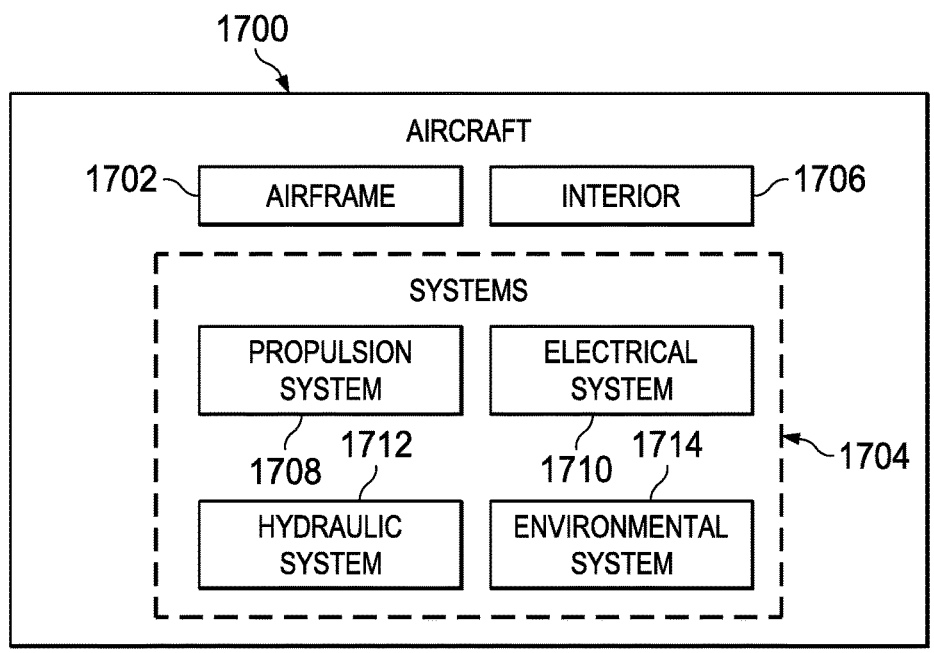
FIG. 17 is an illustration of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Transport system 208 from FIG. 2 and the components within transport system 208 may be made during component and subassembly manufacturing 1606. In addition, transport element support assembly 202 may be used in parts made for routine maintenance and service 1614 as part of a modification, reconfiguration, or refurbishment of aircraft 1700.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614 in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

The illustrative embodiments decrease transport system manufacturing and installation time. The transport element support assembly is a single structure that provides electro-magnetic isolation, location adjustment, and support for a transport element. With components in the transport element support assembly secured, a mechanic can rotate the entire mechanism in order to achieve the desired alignment with respect to pre-drilled holes in the rib. As the assembly is rotated, the centerline of the transport element is moved. The design of the assembly makes sure that the transport element centerline only moves within a desired distance range. Since hundreds of these structures are installed in an aircraft, significant time savings will be realized.

Illustrative embodiments eliminate many of the components previously used to isolate and secure tubing. Further, the illustrative embodiments eliminate the need for each of the components to have separate electromagnetic effect protection. Electromagnetic isolation is achieved from transport element support assembly 202 alone.

Because rotation of the assembly offsets manufacturing defects and upstream alignment problems, less rework will be necessary during installation. Decreasing rework saves time, saves manpower, and drives down cost.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A transport element support assembly comprising:
   a front plate having a first opening and a first set of holes;
   a back plate having a second opening and a second set of holes;
   a chamber formed by the front plate and the back plate, the chamber interposed between the front plate and the back plate and configured to hold a transport element; and
   a grommet positioned within the chamber, wherein the transport element support assembly formed by the front plate, the back plate, and the grommet is configured to provide electrical isolation between the transport element and an aircraft structure;
   wherein a hole pattern formed by an axial alignment of the first set of holes with the second set of holes is split into a plurality of hole pattern sets, wherein each hole pattern set is configured to match a hole pattern in the aircraft structure and each hole pattern set is configured to provide a different centerline position of the transport element.

2. The transport element support assembly of claim 1 further comprising:
   alignment features configured to align the front plate to the back plate such that the first set of holes remains aligned to the second set of holes.

3. The transport element support assembly of claim 2, wherein the back plate has a flange with a circular shape and an angle configured to hold the grommet in place.

4. The transport element support assembly of claim 3, wherein the front plate has a recess with an angle configured to hold the grommet in place.

5. The transport element support assembly of claim 1 further comprising:
   a key representing a configuration of the transport element support assembly when a centerline of the transport element is in a nominal position.

6. The transport element support assembly of claim 1, wherein the front plate and the back plate abut each other.

7. The transport element support assembly of claim 1, wherein a rotation of the transport element support assembly adjusts a centerline of the transport element in at least one of a lateral direction or a vertical direction.

8. The transport element support assembly of claim 7, wherein the rotation of the transport element support assembly adjusts the centerline of the transport element in at least one of the lateral direction or the vertical direction within selected tolerances.

9. The transport element support assembly of claim 8, wherein the rotation creates a desired fit between the transport element support assembly and the aircraft structure, and further comprising:
   a fastener system configured to secure the transport element support assembly to the aircraft structure after the rotation is completed.

10. A fluid system for an aircraft, the fluid system comprising:
   a tube; and
   a tube support assembly comprising:
      a front plate having a first opening and a first set of holes;
      a back plate having a second opening and a second set of holes;
      a chamber formed by interfacing the front plate and the back plate, wherein the chamber is interposed between the front plate and the back plate and is configured to hold the tube; and
      a grommet positioned within the chamber, wherein the tube support assembly formed by the front plate, the back plate, and the grommet is configured to provide electrical isolation between the tube and an aircraft structure;
      wherein a hole pattern formed by an axial alignment of the first set of holes with the second set of holes is split into a plurality of hole pattern sets, wherein each hole pattern set is configured to match a hole pattern in the aircraft structure and each hole pattern set is configured to provide a different centerline position of the tube.

11. The fluid system of claim 10, wherein the tube support assembly further comprises:
   alignment features configured to align the front plate to the back plate such that the first set of holes remains aligned to the second set of holes.

12. The fluid system of claim 11, wherein the tube support assembly further comprises:
   a key representing a configuration of the tube support assembly when a centerline of the tube is in a nominal position.

13. The fluid system of claim 10, wherein the front plate and the back plate are positioned on a same side of the aircraft structure.

14. The fluid system of claim 13, wherein a rotation of the tube support assembly adjusts a centerline of the tube in at least one of a lateral direction or a vertical direction within selected tolerances to create a desired fit between the tube support assembly and the aircraft structure.

15. The fluid system of claim 10, wherein the aircraft structure is a rib and the tube support assembly is configured to provide electrical isolation between the tube and the rib during an electromagnetic event.

16. The fluid system of claim 10, wherein the back plate has a flange with a circular shape and an angle configured to hold the grommet in place.

17. The fluid system of claim 15, wherein the front plate has a recess with an angle configured to hold the grommet in place.

18. The fluid system of claim 10, wherein the front plate and the back plate abut each other.

19. The fluid system of claim 14, wherein the rotation of the tube support assembly adjusts the centerline of the tube in at least one of the lateral direction or the vertical direction.

20. The fluid system of claim 14, further comprising:
   a fastener system configured to secure the tube support assembly to the aircraft structure after the rotation is completed.

* * * * *